Feb. 8, 1944.  W. A. WISSLER ET AL  2,341,006

METHOD OF MAKING COMPOSITE METAL ARTICLES

Filed March 17, 1939

Inventors:
WILLIAM A. WISSLER
WILBER B. MILLER

By Charles C. Scheffler
Attorney

Patented Feb. 8, 1944

2,341,006

UNITED STATES PATENT OFFICE 2,341,006

METHOD OF MAKING COMPOSITE METAL ARTICLES

William A. Wissler and Wilber B. Miller, Niagara Falls, N. Y., assignors to Haynes Stellite Company, a corporation of Indiana Application March 17, 1939, Serial No. 262,374

1 Claim. (Cl. 29—157.1)

This invention relates to a method for making composite metallic articles. It is particularly directed to a method for making composite articles comprising a body portion and a protective surface portion which in use is subjected to mechanical wear or oxidation at elevated temperatures.

Heretofore, articles of this type have usually been produced by manually applying a suitable welding rod and a source of high temperature heat, such as an oxy-acetylene flame or an electric arc, to the area where the protective metal was to be deposited. This method, however, is rather slow and requires great skill on the part of the operator. Frequently, due to the inaccessibility of the area to which the protective layer is to be applied, such manual method is applicable either not at all or only with difficulty. For example, in certain types of valves or bushings the seating surface or bearing surface is located deeply within the body of the valve or the bushing so that the proper manual application of a welding rod and welding flame would in practice be greatly hampered if not made impossible.

Therefore, it is among the objects of the present invention to provide a method for fusion-depositing a layer or layers of protective metal on difficultly accessible surfaces located deeply within metallic bodies whereby a smooth layer of such protective metal can be rapidly produced without exercise of great skill.

A typical article prepared in accordance with this invention and an embodiment of the type of furnace suitable for carrying out the method of the invention are shown by way of example in the accompanying drawing, in which Fig. 1 shows a valve body in cross-section having a deep-seated valve seat area, prepared for receiving a layer of protective metal;

In its general aspect the present invention comprises the following steps:

1. Preparing the article to be treated by forming thereon or in conjunction therewith means for retaining the protective metal;

2. Passing the article so prepared, preferably in a continuous operation, through the high temperature zone of a furnace maintained at a temperature which is preferably above the melting point of the base material; and 3. Passing the article from the high temperature zone of the furnace to one or more preferably immediately adjacent cooling zones for cooling and solidifying the composite article thus obtained.

According to the weight and composition of the article to which the protective material is to be applied, the temperatures to be used in the furnace will vary. For example, when treating articles made of steel by applying to them a wear-resistant alloy of the cobalt-chromium-tungsten type such as may be obtained, for instance, under the trade-mark "Stellite" which has a melting point considerably below that of steel, a furnace temperature of between about 1300° C. and 1500° C. may be employed.

Other materials such as bronze, a nickel-copper alloy, such as may be obtained, for instance, under the trade-mark "Monel metal," and high chromium steel may be used with similar advantage for the protective layer.

In the case of certain alloys, for example bronze, it may be advantageous to produce the alloy, constituting the protective metal, in situ by placing the alloying components within the retaining means and thus to form the alloy at the same time and by means of the same operations as those which are employed to provide the article with the desired protective layer.

The furnace for carrying out the method of this invention may be of any suitable type. A molybdenum-wound electric furnace may be used, the high temperature zone of which has a non-oxidizing atmosphere, for example a hydrogen atmosphere, to prevent oxidation of the molybdenum winding. With other types of heating elements, a neutral or reducing atmosphere can be used to prevent excessive scaling of the base material of the article to be treated.

Figure 1:
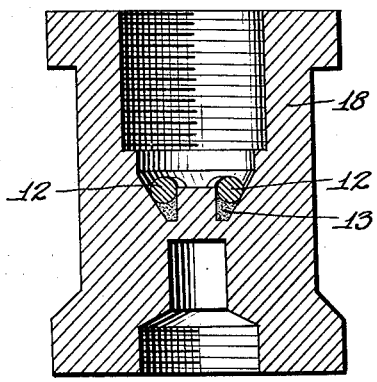
Figure 2:
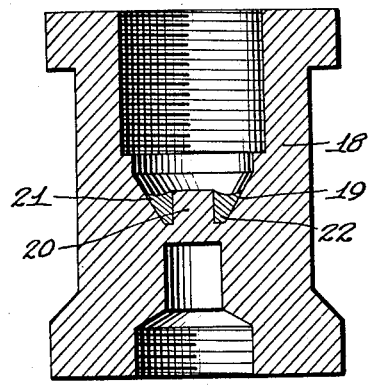
Fig. 2 is a cross-section of the same valve body after the protective metal has been melted and bonded to the body.
Figure 3:
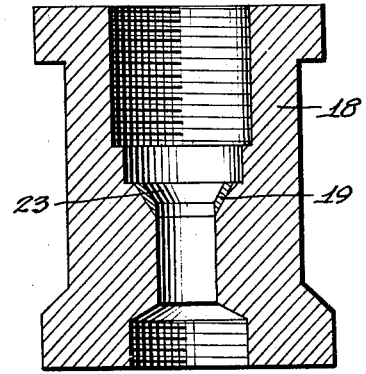
Fig. 3 is a cross-section of the same valve body in the finished state.

Fig. 1 represents the cross-section of a valve body 18 in which a valve seating area 19 is located deeply within the valve body. In this and similar cases, it is advantageous to forge, machine or otherwise to produce the valve body 18 in such a manner that a core 20, integral with the base material of the valve body, is formed which, in conjunction with a bevelled wall 21, forms a recess within the valve body for receiving pieces 12 of protective metal and, if necessary, a flux material 13. When the article so prepared is exposed to a suitable high temperature in the furnace, the protective metal will coalesce and fill the recess while at the same time becoming bonded to the base metal of the article. After this metal has been fused to the base metal of the valve body in the high temperature zone of a furnace, it will form an annular, relatively deep layer 22 of protective metal as shown in Fig. 2. After complete cooling and solidification drilling out the core 20 and suitably machining the surface of protective metal bared by the drilling operation produces a seating surface as shown at 23 in Fig. 3.

It may sometimes be more economical to dispense with the possibly difficult formation of the deep annular groove. In that event, a more readily produced cylindrical recess is formed in the base material and a piece of tubing of suitable outer diameter and suitable material is placed within the cylindrical recess substantially coaxial therewith. A deep annular groove is thus formed between the inner wall of the cylindrical recess and the outer wall of the tubing.

Figure 4:
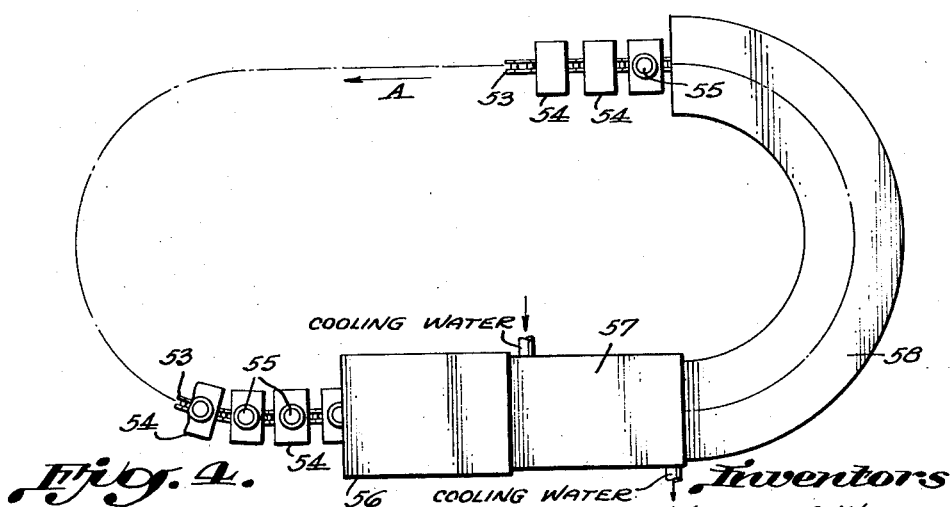
Fig. 4 shows a diagrammatic plan view of a furnace suitable for carrying out the method of this invention.

For continuous operation of the process of this invention, a furnace assembly may be used as indicated diagrammatically in a plan view in Fig. 4. An endless belt 53 is equipped with a plurality of horizontally disposed supporting platforms 54 for continuously conveying articles 55 through a furnace 56 and an adjacent cooling chamber 57. The construction of the belt 53 and the supporting platforms 55 carried thereon is such as to maintain the articles 55 in a substantially horizontal position. When the belt 53 moves in the direction of the arrow A, the articles 55 will first pass through the high temperature zone of the furnace 56 where the protective metal is coalesced and fused to the base material of the article. From this zone, the article passes directly into the cooling chamber 57 which may be cooled by circulating water or any other suitable cooling medium. A non-oxidizing or neutral atmosphere may be maintained both in the furnace 56 and in the cooling chamber 57. After having been solidified while passing through the chamber 57, the articles then continue through a further adjacent chamber 58 in which they are further cooled. Upon leaving the chamber 58, the articles 55 are manually or otherwise removed from their respective platforms 54 to be replaced by new articles prepared by any of the methods described above. The speed of the conveyor belt 53 and the temperature in the furnace 56 will largely depend on the weight of the article to which the protective metal is to be applied since both the article and the protective metal must be heated to about the same temperature within the period of time during which a platform 54 passes through the furnace 56.

A continuous furnace as described above is particularly suited for the mass production of articles where a certain amount of dilution of the protective metal by the iron of the base material is not objectionable. In some instances, however, it is desirable to avoid such dilution as much as possible, for example, when using an alloy of the cobalt-chromium-tungsten type as the protective metal. To forestall an undesirable extent of dilution of this alloy by the iron of the base material, it is preferable to remove the article as quickly as possible from the high temperature zone of the furnace. After the protective alloy has melted this rapid removal may be accomplished, for example, by employing a pushbar or any other suitable means entering the furnace from its loading end and either manually or automatically pushing the fused article quickly into an adjacent, preferably water-cooled, zone of the furnace. After completion of this operation the pushbar is withdrawn and returned to the loading end of the furnace in order to move a new, untreated article into the high temperature zone thus completing the cycle of operation.

It is obvious that the above described method is susceptible to further modifications and refinements without thereby departing from the spirit of the invention.

We claim:

A method of making a shaped, smooth-surfaced lining of difficultly-machinable cobalt-chromium-tungsten alloy on a deep inner clean wall surface portion of a hollow steel body, access to which portion is only by a narrow passage, which method comprises forming of the metal of said body a retaining wall spaced from said inner wall surface portion; placing a flux and solid pieces of said alloy between said wall and said surface portion and in contact with said surface portion; heating said body and said alloy pieces in a non-oxidizing atmosphere of a furnace until the cobalt-chromium-tungsten alloy melts and bonds with the unmelted steel of said surface portion and of said retaining wall; cooling said body and solidifying said alloy; and removing said retaining wall by machining.

WILLIAM A. WISSLER.
WILBER B. MILLER.